Sept. 13, 1932.  J. A. SMITMANS  1,877,072
FLYING CUTTER
Filed Oct. 25, 1929    2 Sheets-Sheet 2
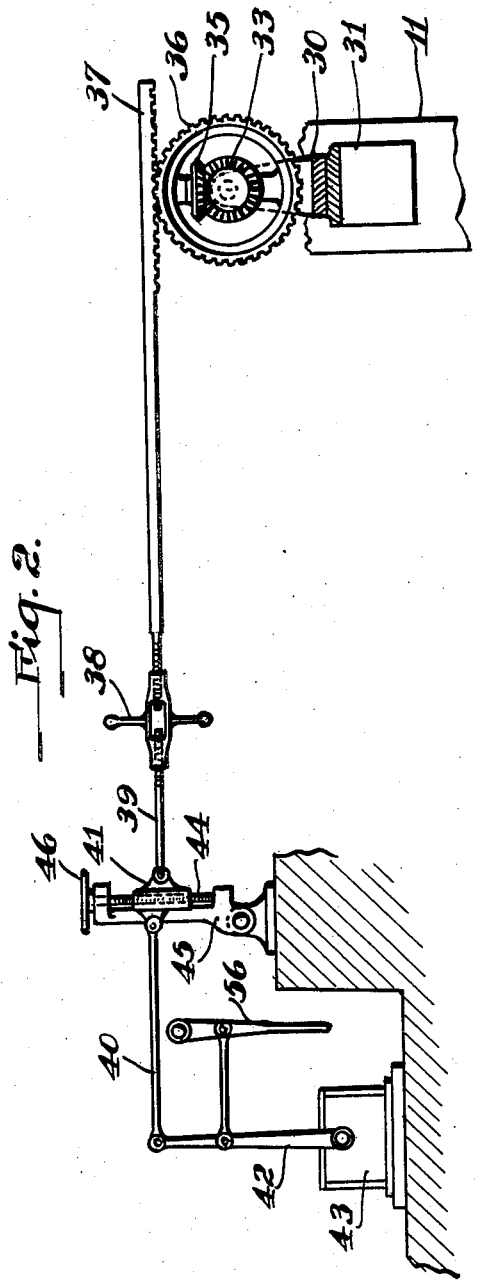
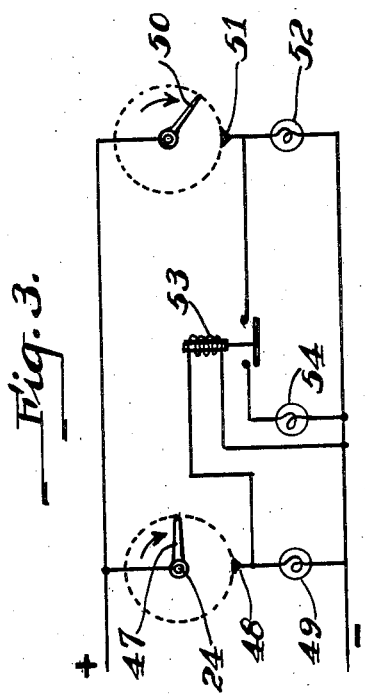
WITNESSES
INVENTOR Patented Sept. 13, 1932

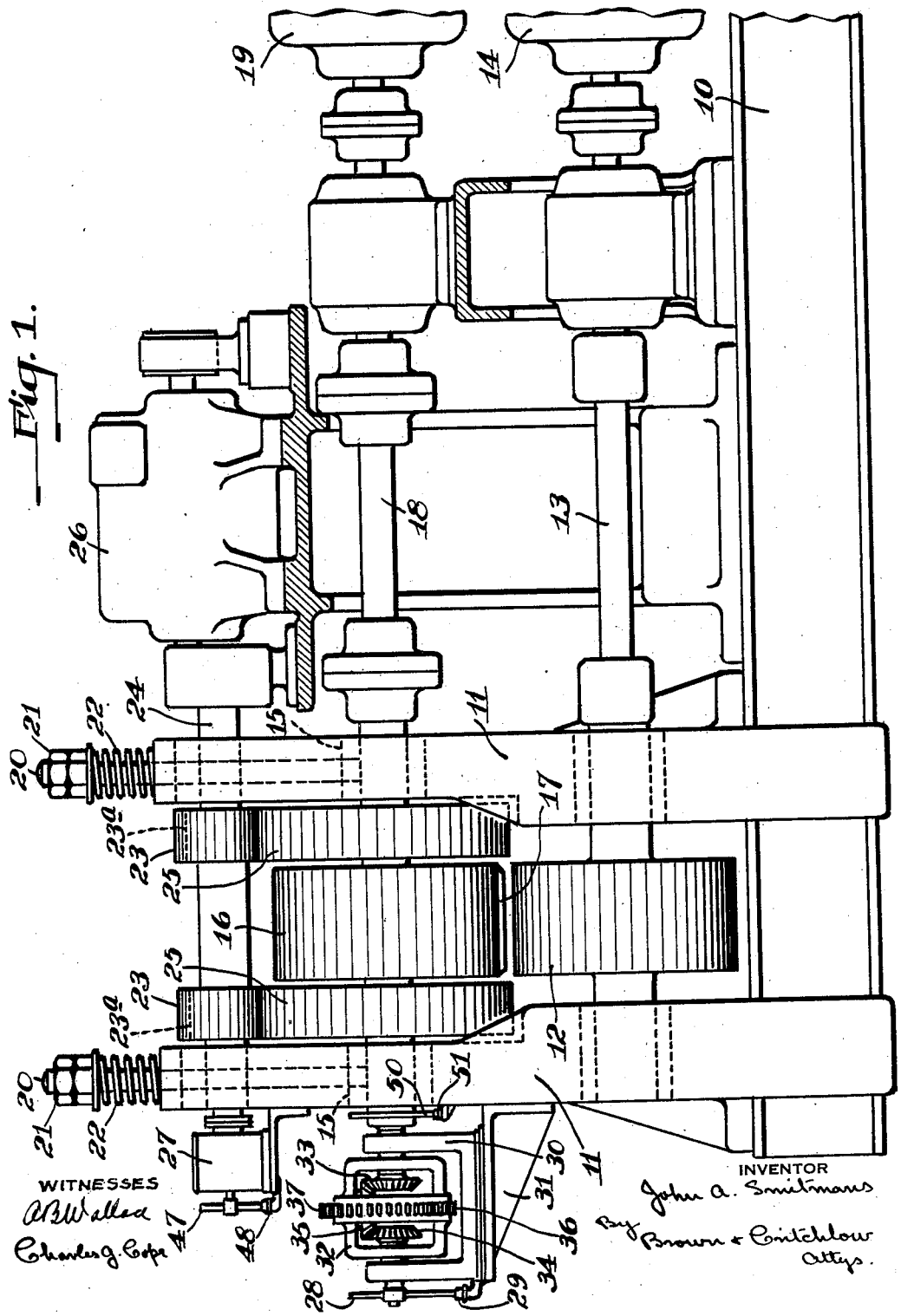

1,877,072

UNITED STATES PATENT OFFICE

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

FLYING CUTTER

Application filed October 25, 1929. Serial No. 402,384.

My invention pertains to flying cutters for severing moving material, a common use being in the cutting into lengths of metal strip or the like as it emerges from a rolling mill. The invention relates especially to that class of flying cutters in which the material to be cut passes between two normally separated members, one of which is a rotating blade-member, and a relative movement of said members towards each other is effected whenever it is desired that a cut shall be made.

It is an object of my invention to provide a means for effecting the relative movement between the cooperating members of a cutter of the above character which will be simple, economical to produce, relatively quiet in its operation, and well suited to the high speeds at which such cutters are sometimes required to work. I attain this object by providing a prime mover, which may remain stationary when not in use, for effecting the desired relative movement between the cooperating cutter members, to bring them together, and further providing means for so timing the operation of such prime mover that the cutter members will be brought together when they are in the correct position of rotation with respect to each other for the cut to be made. Other objects of my invention will appear from the following specification and appended claims.

As an example of one form in which my invention may be embodied, I have described a flying cutter constructed in accordance therewith in the following specification and shown the same in the accompanying drawings, in which:

Fig. 1 is a front elevation;

Fig. 2 is a side view, of a schematic nature, showing the means for adjusting the timing of the device, and for correlating such timing automatically with the mill speed; and Fig. 3 is a circuit diagram showing a system of lights employed for indicating the relative position of the parts as to timing.

The flying cutter comprises a base 10 carrying a pair of standards 11 in the lower parts of which is mounted an anvil roll 12, the same receiving power through a shaft 13 from an electric motor 14. In the standards 11 there are also mounted, so as to be capable of vertical reciprocation therein, a pair of bearing blocks 15 which receive the trunnions of a blade holder 16, carrying a blade 17. The blade holder 16 is rotated, through a shaft 18 from an electric motor 19.

The bearing blocks 15 have rods 20 extending upwardly therefrom beyond the tops of the standards 11 and are provided with nuts 21 at their upper extremities. Springs 22 are disposed between the nuts 21 and the tops of the standards 11, and thus tend at all times to move the bearing blocks 15 upwardly and thereby raise the blade holder 16 into a position in which its blade 17 will not make cutting engagement with the anvil roll 12.

In order to depress the blade holder 16 when it is desired to sever the strip, which passes between the blade holder and the anvil roll 12, rolls 23 are mounted on eccentrics 23a, carried by a shaft 24 rotatably mounted in the standards 11. These rolls engage bearing wheels 25 carried by the shaft of the blade holder 16 on each side of the latter. When the shaft 24 is revolved, the rolls 23, rotating on the eccentrics 23a, press upon the bearing wheels 25 and move the blade holder 16 downwardly, the extent of the complete downward movement being such that the edge of the blade 17 will come into cooperative relation with the anvil roll 12. The motors 19 and 14 rotate the edge of the blade 17 and the anvil roll, respectively, at substantially the face speed of the moving strip which passes between them; so that upon the blade holder being moved downward, as above described, the strip will be severed without its motion being impeded.

For rotating the shaft 24, an electric motor 26 is connected therewith, as through a suitable reduction gearing, so that when current is supplied to the motor, the blade holder will be depressed as above mentioned. It will, of course, be useless to depress the blade holder 16 unless it reaches its lowest position at substantially the time, in the rotation of the blade holder, when the blade 17 is opposite the anvil roll. To meet this condition, I provide that when a contact is made, for the purpose of causing the strip to be severed, the circuit of the motor 26 shall be partly closed, the closing of such circuit being completed by a second contact, which latter is timed so as to cause the motor 26 to complete the downward movement of the blade holder at the moment when the blade 17 is in its lowermost position.

A limit switch 27 is mounted on the shaft 24 and is connected in circuit with a suitable manual or automatic contacting device and the motor 26. Connected in the same circuit is a rotating contactor 28, adapted to make contact at one point during its rotation with a contact 29. Thus, upon the contacting device being either manually or automatically operated, with a view to severing the strip, the circuit to the motor 26, through the limit switch 27 will not be completed until such moment as the contactor 28 engages the contact 29. If such moment of contact is the proper one,—with reference to the speed at which the motor 26 will turn the shaft 24, the position of rotation of the blade 17 at the time of contact and the speed of rotation of the blade holder 16,—the blade holder will reach its extreme lowest position and the blade 17 will arrive opposite the anvil 12 simultaneously. Thereby a proper cut will be made, and without either impeding the incoming metal or kicking forward the severed end. The limit switch 27 is of a character well understood in the art, and is constructed so that the motor 26 turns the shaft 24 through but one revolution.

The contactor 28 is rotated synchronously with the blade holder 16, and means are provided for adjusting the angular position of the contactor with respect to such blade holder. To this end, a stand 30 is mounted on a bracket 31 secured to one of the standards 11, such stand being formed with bearings for a differential housing 32. Into one side of the housing 32 projects a shaft carrying a bevel pinion 33 and connected with the shaft of the blade holder 16. The housing carries a second shaft, coaxial with the first, to the outer end of which the contactor 28 is secured, and the inner end of which carries a bevel pinion 34 similar to the pinion 33. A third bevel pinion 35 meshes between the pinions 33 and 34. It will be seen that if the differential housing 32 remains stationary, the contactor 28 will rotate with the blade holder 16 and maintain the same angle with respect thereto. If, however, the differential housing is rocked in its bearings the angular position of the contactor 28 with respect to the blade holder will be altered.

For rocking the differential housing 32 in its bearings, thereby to adjust the angular position of the contactor 28, the housing is provided with a ring gear 36 with which a rack 37 meshes. The rack (Fig. 2) is connected, by means of a turn buckle 38 with a link 39 which is connected, in turn, to a rod 40 through the intermediary of a sleeve 41. The rod 40 is pivoted to a lever 42 supported in a suitable stand 43. The sleeve 41 is threaded to receive a vertically disposed screw 44 mounted in a lever 45 and carrying at its upper end a hand wheel 46. It will be obvious that by operating the turn buckle 38 a coarse adjustment of the position of the differential housing 32 can be made; whereas by operating the hand wheel 46 a fine adjustment can be effected. By manipulating the turn buckle 38 and hand wheel 46, the operator of the machine can so adjust the position of the contactor 28 that the motor 26 will be started at such a moment that the blade holder 16 will reach its lowest position at a time when the blade 17 has reached a position in its rotation where it is opposite the anvil roll 12.

To enable the operator readily to determine when the blade holder 16 and the blade 17 arrive at their lowest positions simultaneously, and, if they do not, which of them is "early",—it being understood that it is frequently desirable to operate devices of this character at exceedingly high speeds,—a system of lamps may be employed wherein one lamp flashes when the blade holder is at its bottom position of rotation, another lamp flashes when the blade is in its bottom position of rotation, and a third lamp flashes when the blade holder and blade are in their bottom positions coincidently. For example, a contactor 47 (Figs. 1 and 3), adapted to engage a fixed contact 48 and thereby flash a lamp 49 when the blade holder 16 is at its lowest position may be mounted upon the shaft 24. A similar contactor 50 adapted to engage a fixed contact 51 and thereby flash a lamp 52 when the blade 17 is in its lowest position may be mounted upon the shaft of the blade holder 16. A relay 53 may be interposed in the circuit of the contactor 47, such relay, when energized, being adapted to close the circuit of a lamp 54 which is connected in the circuit of the contactor 50. Thus the lamp 54 will flash whenever the contactors 47 and 50 make contact at the same time, that is to say, when the blade holder 16 and the blade 17 are simultaneously in their lowest positions. When the lamp 54 does not flash, it is indicated that an adjustment of the angular position of the contactor 28 is desirable. By noting which of the two lamps 49 and 52 flashes first, the operator can readily see in which direction he must make the adjustment.

To provide for variations of the mill speed, I may connect the lever 42 (Fig. 2) with the arm 56 of a rheostat device controlling the speed at which the motors 14 and 19 operate. In that way, when the arm 56 is rocked in one direction or the other, to bring the peripheral speed of the edge of the blade 17 and that of the anvil roll 12 into correspondence with a new mill speed, the lever 42 will be likewise rocked, with the result that the angular position of the contactor 28 is adjusted to accord with the new speed of the blade holder 16. In this way compensation is automatically made for changes in the mill speed. The flying cutter of my invention has an advantage in that the blade holder is maintained in rotation at all times, so that any difficulty connected with the inertia and momentum of the blade holder and blade (which parts may be quite heavy if desirable for the work being performed), in bringing them up to the high peripheral speed at which these machines frequently operate, and subsequently retarding them, is avoided. At the same time the actuating device for moving the members of the cutter into operative relation is especially well suited for the extremely rapid operation which is at times necessary in order to effect the relative movement of the members during a single revolution of the latter. Since the operating parts of the actuating device only move when a cut is to take place, wear and noise are reduced to a minimum.

Whilst I have described one form in which my invention may be embodied, it is to be understood that it may take other forms, and that changes may be made in the form described and shown, without exceeding its scope, what I claim being:

1. A flying cutter comprising a continuously rotating blade member, a member adapted to cooperate therewith when said members are in approached relation with each other, said members being normally separated, a device, independent of said blade member, for effecting an approaching movement between said members thereby to bring them into cooperative relation to produce a cut, and means for starting the effective operation of said device at such time as to complete said approaching movement substantially when said blade member is opposite said cooperating member.

2. A flying cutter comprising a continuously rotating blade member, a member adapted to cooperate therewith when said members are in approached relation with each other, said members being normally separated, a device, independent of said blade member, for effecting an approaching movement between said members thereby to bring them into cooperative relation to produce a cut, an electric motor for operating said device, and means for starting said motor at such time as to complete said approaching movement substantially when said blade member is opposite said cooperating member.

3. A flying cutter comprising a rotatable blade member, a member adapted to cooperate therewith, said members being normally separated, a device for effecting an approaching movement between said members to allow a cut to be effected, an electric motor for operating said device, and a rotatable contactor arranged to rotate coincidently with said blade member, said contactor being connected in the starting circuit of said motor and being angularly disposed with reference to said blade member so as to start said motor at a time to complete said approaching movement substantially when said blade member is opposite said cooperating member.

4. A flying cutter comprising a rotatable blade member, a member adapted to cooperate therewith, said members being normally separated, a device for effecting an approaching movement between said members to allow a cut to be effected, an electric motor for operating said device, a rotatable contactor arranged to rotate coincidently with said blade member, said contactor being connected in the starting circuit of said motor and being angularly disposed with reference to said blade member so as to start said motor at a time to complete said approaching movement substantially when said blade member is opposite said cooperating member, and means for adjusting during rotation the angular position of said contactor with reference to said blade member.

5. A flying cutter comprising a rotatable blade member, a member adapted to cooperate therewith, said members being normally separated, a prime mover for effecting an approaching movement between said members to allow a cut to be effected, means for starting the effective operation of said prime mover at such time as to complete said approaching movement substantially when said blade member is opposite said cooperating member, and means for automatically adjusting the timing of said last named means to accord with the speed of said blade members.

6. A flying cutter comprising a rotatable blade member, a member adapted to cooperate therewith, said members being normally separated, a device for effecting an approaching movement between said members to allow a cut to be effected, an electric motor for operating said device, a rotatable contactor arranged to rotate coincidently with said blade member, said contactor being connected in the starting circuit of said motor and being angularly disposed with reference to said blade member so as to start said motor at a time to complete said approaching movement substantially when said blade member is opposite said cooperating member, and means for automatically adjusting the angular position of said contactor with reference to said blade member to accord with the speed of the latter.

In testimony whereof, I sign my name.

JOHN A. SMITMANS.